(12) United States Patent
Grigsby et al.

(10) Patent No.: US 8,345,098 B2
(45) Date of Patent: Jan. 1, 2013

(54) DISPLAYED VIEW MODIFICATION IN A VEHICLE-TO-VEHICLE NETWORK

(75) Inventors: Travis M. Grigsby, Austin, TX (US);
Steven Michael Miller, Cary, NC (US);
Pamela Ann Nesbitt, Tampa, FL (US);
Lisa Anne Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1149 days.

(21) Appl. No.: 12/049,436

(22) Filed: Mar. 17, 2008

(65) Prior Publication Data
US 2009/0231431 A1 Sep. 17, 2009

(51) Int. Cl.
*G21K 1/02* (2006.01)
*G21K 3/00* (2006.01)
*H01J 35/08* (2006.01)

(52) U.S. Cl. ......... 348/148; 348/149; 348/143; 348/159
(58) Field of Classification Search .................. None
See application file for complete search history.

(56) References Cited

U.S. PATENT DOCUMENTS

| | | | | |
|---|---|---|---|---|
| 5,621,645 A * | 4/1997 | Brady | ............................ | 701/117 |
| 5,825,283 A * | 10/1998 | Camhi | ............................ | 340/438 |
| 6,049,756 A * | 4/2000 | Libby | ............................ | 701/301 |
| 6,208,270 B1 * | 3/2001 | Dunn | ............................ | 340/961 |
| 6,211,907 B1 | 4/2001 | Scaman et al. | | |
| 6,593,960 B1 * | 7/2003 | Sugimoto et al. | ............. | 348/148 |
| 6,608,559 B1 * | 8/2003 | Lemelson et al. | ....... | 340/539.13 |
| 6,734,787 B2 * | 5/2004 | Ikeda | ......................... | 340/425.5 |
| 6,871,971 B2 * | 3/2005 | Morrison | ....................... | 359/850 |
| 6,965,604 B1 | 11/2005 | Sato et al. | | |
| 7,034,668 B2 * | 4/2006 | Engelman et al. | ............ | 340/435 |
| 7,100,190 B2 | 8/2006 | Johnson et al. | | |
| 7,174,402 B2 | 2/2007 | Ellerbrock et al. | | |
| 7,193,645 B1 | 3/2007 | Aagaard et al. | | |
| 7,227,493 B2 * | 6/2007 | Oswald et al. | .................. | 342/70 |
| 7,248,968 B2 * | 7/2007 | Reid | ............................ | 701/301 |
| 7,463,138 B2 * | 12/2008 | Pawlicki et al. | ............. | 340/435 |
| 7,477,758 B2 * | 1/2009 | Piirainen et al. | ............. | 382/100 |
| 7,501,934 B2 | 3/2009 | Tischer | | |

(Continued)

OTHER PUBLICATIONS

Tracy Staedter, "Hello, from the car in front", Jun. 12, 2007, from http:www.abc.net.au/science/news/stories/20071194084.htm.

(Continued)

*Primary Examiner* — Thu Nguyen
*Assistant Examiner* — Angela Widhalm
(74) *Attorney, Agent, or Firm* — Jordan IP Law, LLC (57) ABSTRACT

In V2V or other networks in which multiple video cameras can share video data, a user may elect to modify a primary view by electronically "removing" obstructing objects from the primary view. The user begins by identifying the objects to be electronically removed from the simulated view, either by designating the boundaries of the objects or by identifying classes of objects to be removed. Pel locations associated with obstructing objects are identified in the primary data set. Video data provided by cameras other than a primary video camera is analyzed to identify common features in the primary and secondary views and to identify pels that correspond with object-associated pels in the primary view. A merged data set, consisting of pel data from the primary data set and from at least one of the secondary data sets, provides the video data presented in the simulated view.

19 Claims, 6 Drawing Sheets

U.S. PATENT DOCUMENTS

| | | | |
|---|---|---|---|
| 7,813,822 B1 * | 10/2010 | Hoffberg | 700/94 |
| 7,938,727 B1 | 5/2011 | Konkle | |
| 8,117,281 B2 | 2/2012 | Robinson et al. | |
| 2002/0164962 A1 * | 11/2002 | Mankins et al. | 455/99 |
| 2003/0023974 A1 | 1/2003 | Dagtas et al. | |
| 2003/0210806 A1 | 11/2003 | YoichiShintani et al. | |
| 2004/0022416 A1 * | 2/2004 | Lemelson et al. | 382/104 |
| 2004/0036622 A1 * | 2/2004 | Dukach et al. | 340/691.6 |
| 2005/0004753 A1 * | 1/2005 | Weiland et al. | 701/208 |
| 2005/0010955 A1 | 1/2005 | Elia et al. | |
| 2005/0031169 A1 * | 2/2005 | Shulman et al. | 382/104 |
| 2005/0102374 A1 * | 5/2005 | Moragne et al. | 709/217 |
| 2005/0185823 A1 | 8/2005 | Brown et al. | |
| 2005/0225634 A1 | 10/2005 | Brunetti et al. | |
| 2005/0278088 A1 * | 12/2005 | Thorner | 701/28 |
| 2006/0187305 A1 * | 8/2006 | Trivedi et al. | 348/169 |
| 2007/0052856 A1 * | 3/2007 | Jung et al. | 348/565 |
| 2007/0139523 A1 | 6/2007 | Nishida et al. | |
| 2007/0174467 A1 | 7/2007 | Ballou et al. | |
| 2008/0088706 A1 | 4/2008 | Girgensohn et al. | |
| 2008/0181132 A1 | 7/2008 | Underhill et al. | |
| 2008/0199050 A1 * | 8/2008 | Koitabashi | 382/107 |
| 2008/0211907 A1 | 9/2008 | Kelly et al. | |
| 2008/0242221 A1 | 10/2008 | Shapiro et al. | |
| 2009/0023446 A1 | 1/2009 | Das | |
| 2009/0041300 A1 * | 2/2009 | Mack | 382/103 |
| 2009/0063419 A1 | 3/2009 | Nurminen et al. | |
| 2009/0092183 A1 | 4/2009 | O'Hern et al. | |
| 2009/0096937 A1 * | 4/2009 | Bauer et al. | 348/739 |
| 2009/0122740 A1 | 5/2009 | Bouazizi | |
| 2009/0226001 A1 | 9/2009 | Grigsby et al. | |
| 2009/0282164 A1 | 11/2009 | Fuehrer et al. | |
| 2010/0175086 A1 | 7/2010 | Gaydou et al. | |
| 2010/0321183 A1 | 12/2010 | Donovan et al. | |

OTHER PUBLICATIONS

Author Unknown, "Dedicated Short Range Communications", from http://en.wikipedia.org/wiki/Dedicated_Short_Range_Communications.

Final Office Action for U.S. Appl. No. 12/049471, mailed Jun. 15, 2012, 17 pages, U.S. Patent and Trademark Office.

Final Office Action for U.S. Appl. No. 12/049489, mailed Apr. 10, 2012, 15 pages, U.S. Patent and Trademark Office.

Non-Final Office Action for U.S. Appl. No. 12/049451, mailed Apr. 18, 2012, 20 pages, U.S. Patent and Trademark Office.

Non-Final Office Action for U.S. Appl. No. 12/049489, mailed Oct. 7, 2011, 9 pages, U.S. Patent and Trademark Office.

\* cited by examiner

DISPLAYED VIEW MODIFICATION IN A VEHICLE-TO-VEHICLE NETWORK

CROSS-REFERENCE TO RELATED APPLICATIONS

This application is related to U.S. patent application Ser. No. (12/049,451) filed concurrently herewith, to U.S. patent application Ser. No. (12/049,458) filed concurrently herewith, to U.S. patent application Ser. No. (12/049,471) filed concurrently herewith, and to U.S. patent application Ser. No. (12/049,489) filed concurrently herewith.

BACKGROUND OF THE INVENTION

The present invention relates to vehicle-to-vehicle (V2V) networks and more particularly to electronically removing identified objects from a displayed view based on video camera data.

Efforts have been underway for some time to establish standards for and to develop technology that would allow drivers within limited geographic areas to "talk" to each other by participating in ad hoc vehicle-to-vehicle networks in which audio, video and other data is shared among participating vehicles. It is envisioned that each vehicle participating in such a vehicle-to-vehicle network would be equipped with microphones for capturing audio data that could be shared directly with other vehicles independently of any existing communications networks, such as cellular telephone networks, and with video cameras for capturing video data both for use within the participating vehicle and for sharing with other vehicles participating in the network.

According to one proposal, data would be shared among vehicles using a Dedicated Short Range Communications (DSRC) wireless protocol operating in the 5.9 Gigahertz band that would support direct vehicle-to-vehicle communications over a relatively short range (100 meters-300 meters). The effective size of the network implemented using the DSRC would be significantly greater than the direct vehicle-to-vehicle maximum range, however, since each vehicle could relay data received from another vehicle to still other vehicles within its range. Relayed data could "hop" one vehicle at the time to vehicles progressively further away from the vehicle that was the source of the data.

Vehicle-to-vehicle networks would serve the general purpose of making participating drivers more aware of what is happening around them and a number of specific purposes, including safety-related purposes. Such networks would permit drivers to alert other drivers of traffic slowdowns, road hazards and approaching emergency vehicles. Such networks could also enable emergency vehicle personnel to alert drivers to their presence, letting alerted drivers anticipate the appearance of the emergency vehicles and more quickly clear paths for them.

The ability of a participating driver to receive and display views generated by video cameras installed in other participating vehicles is a major factor in enabling vehicle-to-vehicle networks to serve such purposes.

BRIEF SUMMARY OF THE INVENTION

The present invention may be implemented as a method of generating a simulated view for presentation on a video display. A primary set of video data is received from the first video camera. User input designating at least one object to be excluded from the view presented on the video display is received along with a secondary set of video data from a video camera other than the first video camera. Data elements in the secondary set of video data representing an object designated to be excluded are identified and a set of video data is generated including data from the primary set and identified data elements in the received secondary set. The generated set of video data is displayed on the video display.

The present invention may also be implemented as a system including a video display and a controller for generating a simulated view to be presented on that video display. The controller includes a first video input system for receiving a primary set of video data from a first video camera, a user interface system for receiving the user input designating at least one object to be excluded from a view presented on the video display, and a second video input system for receiving a secondary set of video data from a video camera other than the first video camera. The controller also includes video processing logic for identifying data elements in the received secondary set of video data representing an object designated to be excluded from the presented view and video combining logic for generating a set of video data that includes video data from the primary set and identified data elements in the secondary set. Finally, the controller includes video driver logic for displaying the generated set of video data on the video display.

Finally, the present invention may be implemented as a computer program product for generating a simulated view for presentation on a video display. The computer program product includes a computer usable medium embodying computer usable program code configured to receive a primary set of video data from a first video camera, to receive user input designating at least one object to be excluded from the view presented on the video display, and to receive a secondary set of video data from a video camera other than the first video camera. The computer usable program code further includes code configured to identify data elements in the received secondary set of video data representing an object designated to be excluded from the presented view, to generate a set of video data including video data from the primary set and identified data elements in the secondary set, and to display the generated set of video data on the video display.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
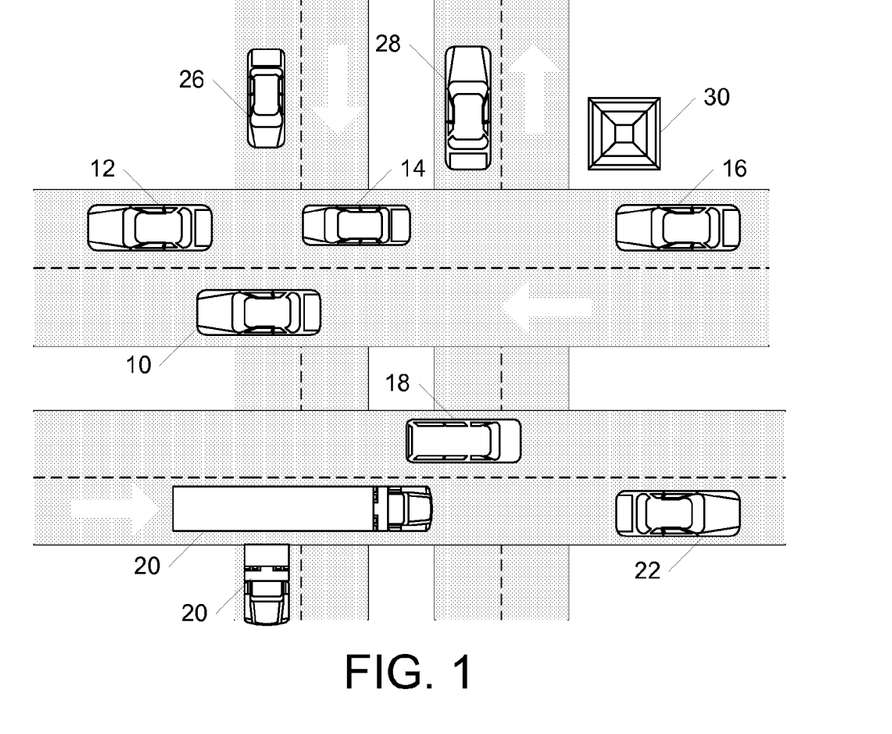
FIG. 1 is an illustration of several roadways traveled by cars and trucks that could participate in a vehicle-to-vehicle network of the type in which the present invention may be implemented.

Referring to FIG. 1 and assuming that all of the vehicles shown there are properly equipped, any of the vehicles, such as car 10, may elect to participate in an ad hoc vehicle-to-vehicle (V2V) network including not only car 10 but also cars 12, 14, and 16 that are traveling in the same direction as car 10, cars 18 and 22 and tractor-trailer 20 that are traveling in the opposite direction and even cars 26 and 28 and truck 24 that are traveling orthogonally to car 10. Being a participant in a V2V network means that each participating vehicle will be able to share audio and video data as well as control data with other participating vehicles.

As a practical matter, roadside base stations, such as base station 30, may be considered participants in V2V networks by receiving data from and providing data to vehicles in the network even though the base stations obviously do not satisfy any conventional definition of the word "vehicle".

Figure 2:
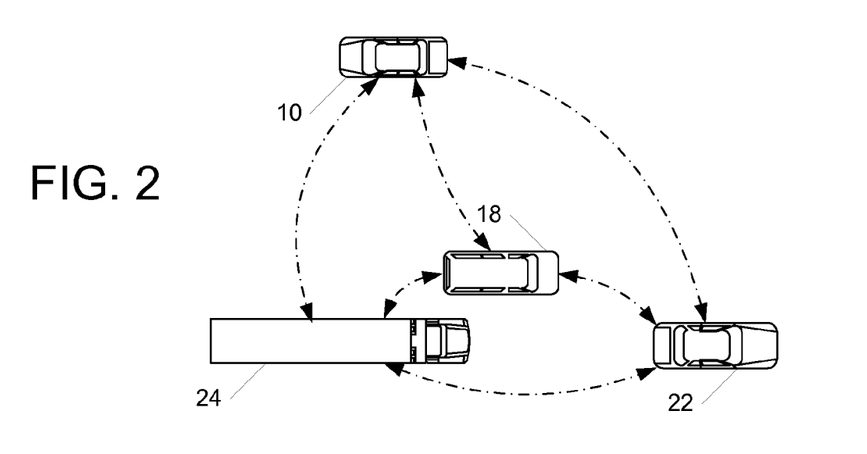
FIG. 2 is an illustration of a few of the cars and trucks that appear in FIG. 1 with additional graphics representing peer-to-peer communication paths among the vehicles.

Referring to FIG. 2, communications among participating vehicles are preferably conducted on a peer-to-peer basis that enables any vehicle in the network to wirelessly communicate directly with any other participating vehicle within a predetermined range determined by the wireless protocol implemented by the network. As noted earlier, the Dedicated Short Range Communications wireless protocol developed for automotive applications has an effective range on the order of 100 to 300 meters, which would be sufficient to enable car 10 to communicate directly with at least cars 18 and 22 and tractor-trailer 20 along with other nearby vehicles (not shown).

The size of the ad hoc network from the perspective of car 10 (or any other participant in the network) is not limited to vehicles with which car 10 may communicate directly. Each participating vehicle can act as a relay point, receiving data from a nearby vehicle and passing it on to other vehicles that are within the direct communication range of the relaying vehicle regardless of whether they are beyond the direct communication range of the vehicle from which the data originated. Thus, data can radiate along chains of vehicles, only one or a few of which may be within the direct communication range of the data source.

Figure 3:
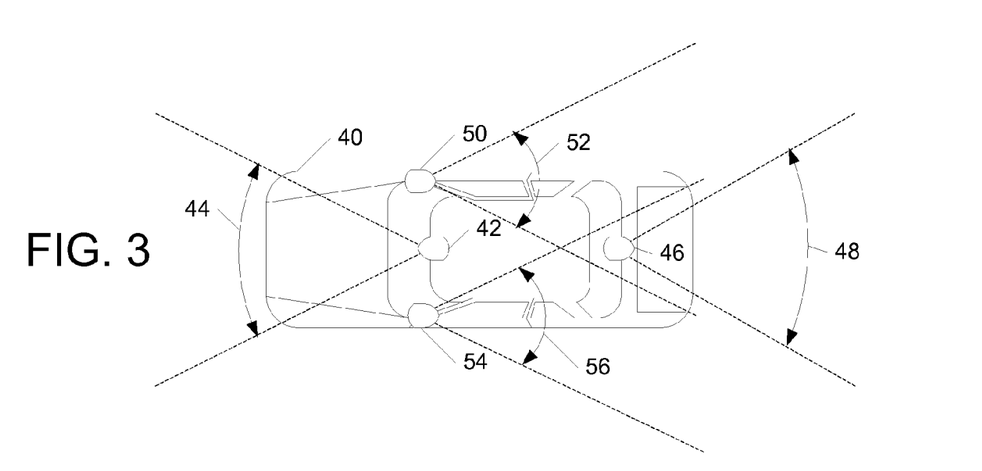
FIG. 3 is an illustration of a single vehicle showing multiple video cameras that could provide video data for use within the vehicle and sharing with other vehicles participating in the vehicle-to-vehicle network.

Referring to FIG. 3, it is assumed that any vehicle that participates in a typical V2V network will have a least one video camera, such as video camera 42 that is mounted on or near the interior rearview mirror of vehicle 40 to provide a video field of view 44 that approximates what the driver of vehicle 40 actually sees when seated behind the steering wheel. Video data captured by video camera 42 would probably be more useful to other participating drivers than to the driver of vehicle 40. The vehicle 40 could, of course, be equipped with additional video cameras, such as a trunk-mounted video camera 46 having a field of view 48 directly behind vehicle 40, a side-mounted video camera 54 having a field of view 56 approximating what the driver would see in the driver-side exterior rearview mirror, and a second side-mounted video camera 50 having a field of view 52 approximating what the driver would see in a passenger-side exterior rearview mirror.

Notwithstanding the driver of the vehicle 40 may be able, by using existing vehicle mirrors, be able to see a least some of what appears in the field of view of the various vehicle-mounted video cameras, video data captured by such cameras could still be useful to the driver. For one thing, the cameras may have a better field of view than the driver since the driver's view in any direction will usually be at least partially obstructed by the vehicle itself. The video cameras may be mounted to eliminate "blind spots" that have plagued drivers practically since the invention of the automobile. Also, video data captured by the cameras may be presented as part of a heads up display the driver can see while continuing to focus on the road in front of the vehicle.

Figure 4:
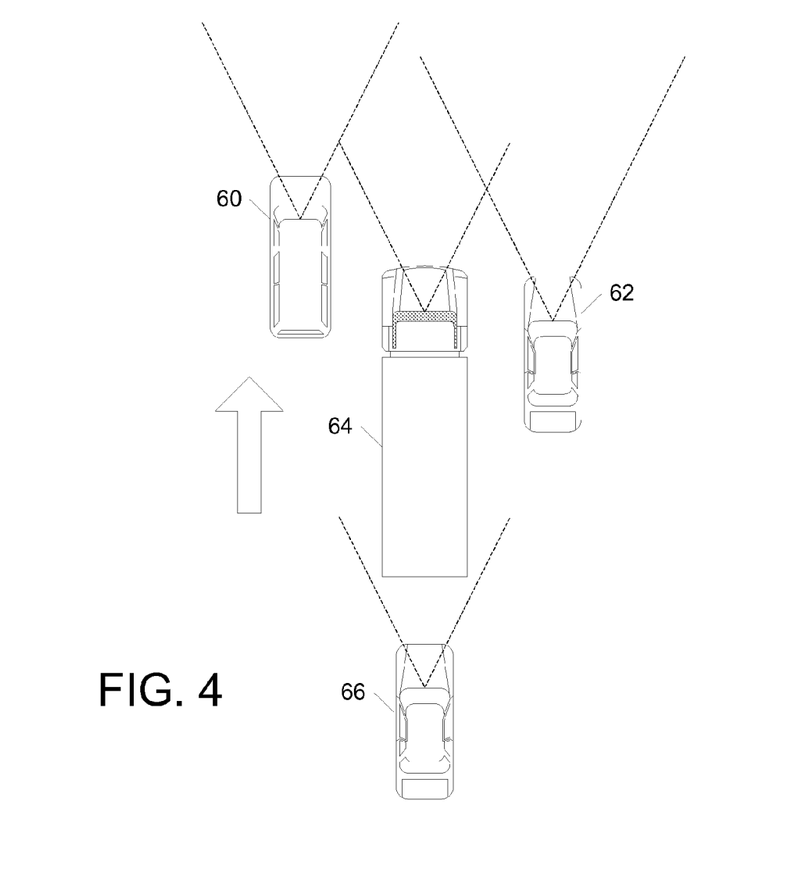
FIG. 4 is an illustration of several vehicles showing fields of view of forward-facing video cameras on each of the vehicles.

In a V2V network, video data captured by cameras mounted on vehicle 40 may also be useful to drivers of other vehicles. FIG. 4 illustrates a traffic scenario that frequently occurs on multi-lane highways. A van 60, a sedan 62, and a tractor-trailer 64 are shown occupying three adjacent lanes and being trailed by a fourth sedan 66. Assuming the roadway in front of the vehicles 60-64 is clear for at least a reasonable distance, the drivers in all three of the vehicles 60-64 will have a good view of the roadway in front of them and will be aware of slowdowns, accidents, emergency vehicles, etc. in their path of travel. The driver of vehicle 66 is not so lucky as his field of view is pretty much limited to the rear doors of tractor-trailer 64. The driver of vehicle 66 has no way of knowing whether the roadway in front of vehicles 60-64 is clear or may have just become the scene of a multi-car traffic accident. The driver's first indication of a problem ahead may be flashing brakelights on one or more of the vehicles ahead of him.

Figure 5:
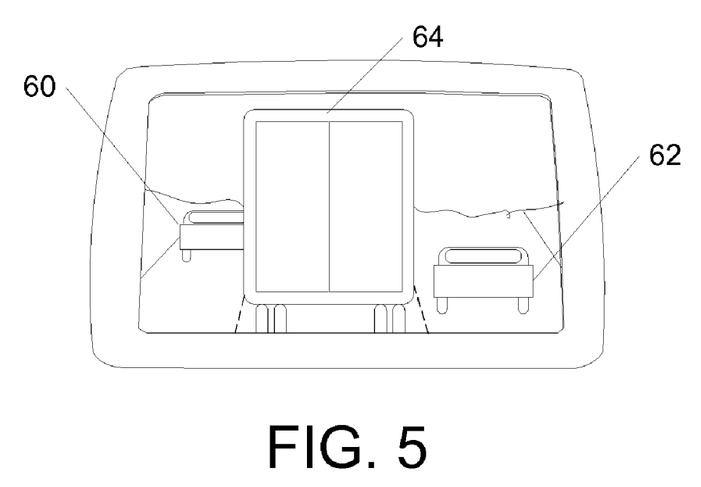
FIG. 5 is an illustration of a video display of a typical view generated by a vehicle-mounted video camera.

The present invention makes it possible for the driver of vehicle 66 to be provided with an in-vehicle simulated view in which selected objects are electronically removed from the view. FIG. 5 illustrates what the driver of vehicle 66 would actually see in the scenario described above. While vehicles 60 and 62 might be visible, most of the driver's field of view would be obstructed by the tractor-trailer 64. In fact, depending on how closely the driver was following the tractor-trailer, virtually the entire field of view could be obstructed by the tractor-trailer 64.

Figure 6:
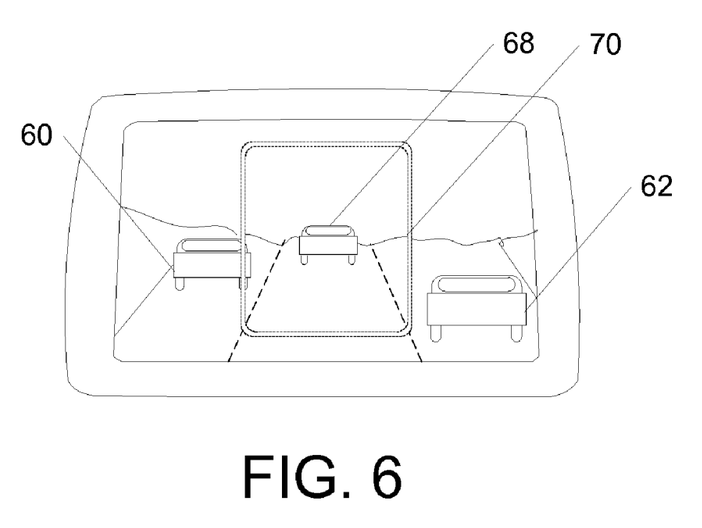
FIG. 6 is an illustration of a simulated video display that could be produced through use of the present invention.

Using video data received from other vehicles, such as vehicles 60 and 62 and even tractor-trailer 64, it is possible to generate a simulated view on an in-vehicle display in vehicle 66 that electronically "removes" the tractor-trailer 64 from the view, allowing the driver of vehicle 66 to "see" what is in front of the tractor-trailer 64. A simulated view that can be made available to the driver of vehicle 66 is illustrated in FIG. 6. The driver would continue to see vehicles 60 and 62. However, the image of tractor-trailer 64 would be electronically replaced by an image of what was in front of the tractor-trailer 64, but in this case a single vehicle 68. In one embodiment of the invention, a wireform representation 70 of the tractor-trailer would remain on the screen as a visible reminder that the tractor-trailer is still physically in front of the vehicle even if it does not appear on the in-vehicle display.

Figure 7:
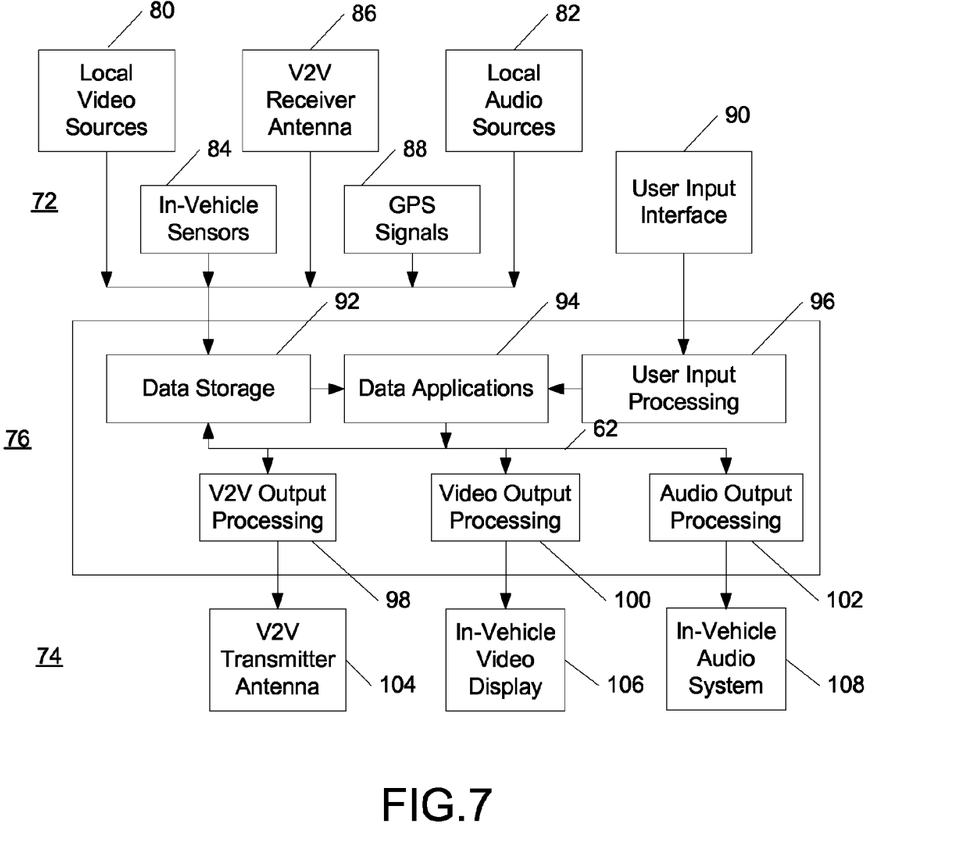
FIG. 7 is the functional block diagram of a system that could be employed to produce the view illustrated in FIG. 6.

The tractor-trailer 64 obviously doesn't physically disappear but is removed electronically by a V2V data processing system integrated into the vehicle 66. FIG. 7 is a functional block diagram of the major functional components for such a data processing system. The data processing system can be roughly divided into three major subsystems: an input subsystem 72 an output subsystem 74, and the data processing subsystem 76 that processes incoming data provided by the input subsystem 72 to provide the output data utilized by the output subsystem 74.

The input subsystem 72 includes local video sources 80 such as vehicle-mounted video cameras of the type already discussed and local audio sources 82, including such sources as vehicle-mounted microphones for capturing voice input from drivers and/or passengers or Bluetooth or other wireless protocols that support the capture of such voice input from wireless headsets used by drivers and/or passengers. The input subsystem 72 further includes connections to in-vehicle sensors 84, an obvious example of which is the vehicle speedometer, and to a GPS or Global Positioning System subsystem 88 that provides the vehicle's current global location.

The input subsystem 72 further includes a user input interface 90 for acquiring user data and commands. The user input interface can be implemented in a number of known ways. Key input technologies, touchscreen technologies and voice recognition technologies are nonexclusive examples of technologies that can be employed to capture user input.

All of the input subsystems described above can be characterized as local subsystems in that they capture data originating at the vehicle itself. The essence of a V2V network is that each vehicle participating in the network can make use of data provided by other participating vehicles. To make that possible, the input subsystem 72 must include a V2V receiver antenna 86 to acquire audio, video and other data from other vehicles participating in the V2V network.

Input data, both local and remote, is at least initially stored in a data storage subsystem 92 in the data processing subsystem 76. Stored data is retrieved from storage for use by data applications 94 that may be invoked by the vehicle driver or passengers using commands entered at the interface 90 and processed in a user input processing subsystem 96.

Output data resulting from execution of data applications in subsystem 94 may be made available to other participating vehicles through the use of a V2V output processing subsystem 98 connected to a V2V transmitter antenna 104. Depending upon the technologies employed, V2V transmitter antenna 104 and V2V receiver antenna 86 may be the same physical device. Output data may, of course, be used within the vehicle as well. Data intended for an in-vehicle video display 106 undergoes processing in a video output processing stage 100 before being directed to the display. Similarly, data intended for the in-vehicle audio system 108 is processed in an audio output processing stage 102 before being sent to the audio system.

Figure 8:
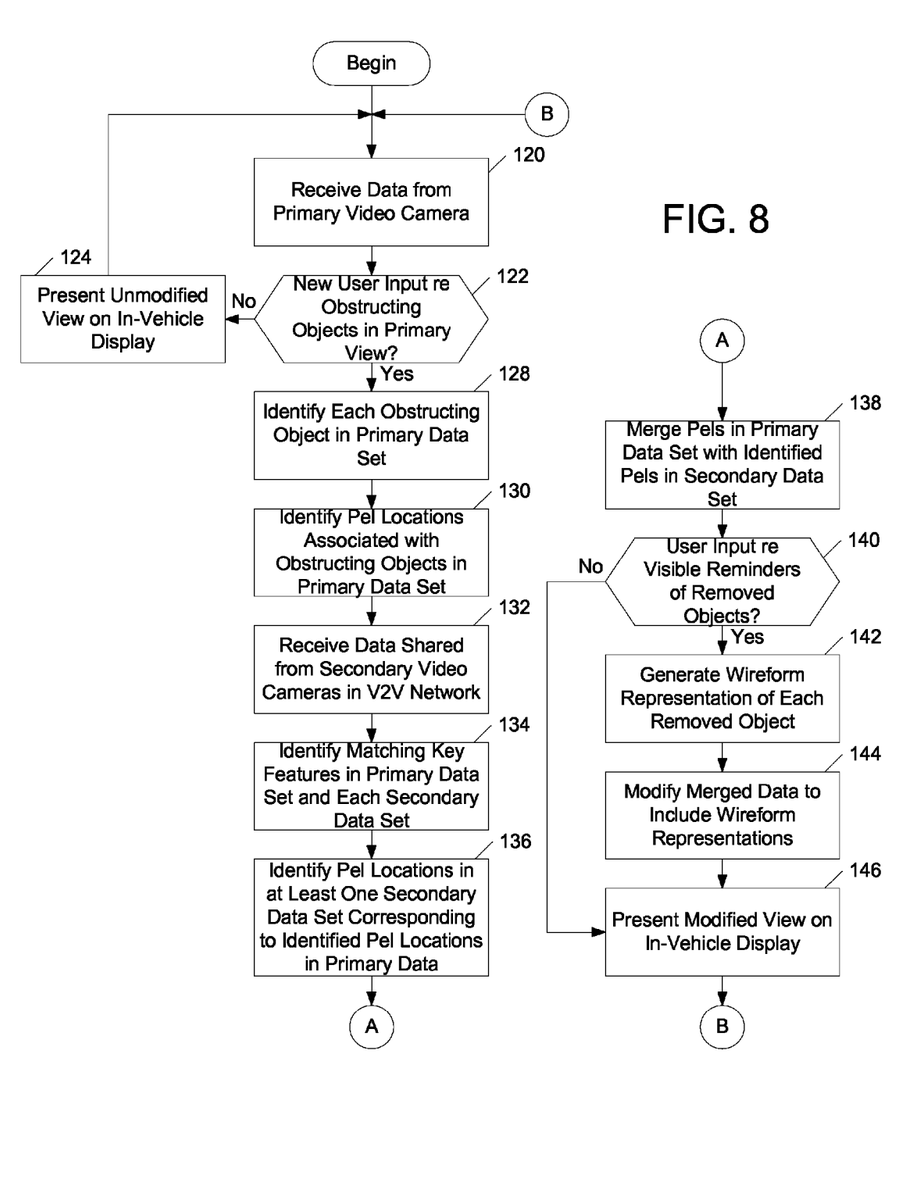
FIG. 8 is a flow chart representing operations that would be performed by the system in producing the simulated view illustrated in FIG. 6.

As noted earlier, the objective of the present invention is to provide an in-vehicle display that simulates what the driver of the vehicle would see if the driver had the power to remove selected objects (that is, obstructions) from the driver's actual view. Referring to FIG. 8, the driver's actual view is defined as the view generated by a primary video camera, typically one mounted on the vehicle itself. A starting point in the process of "building" the simulated view is receiving data (step 120) from the primary video camera. Once the capture of data from the primary video cameras underway, the system monitors the user interface to determine whether the user has provided instructions designating (step 122) obstructing objects that appear in the primary view. If no user instructions are provided, the unmodified data captured by the primary video camera is directed (step 124) to an in-vehicle display and the system enters a program loop consisting of operations 120, 122 and 124 where it remains until a user input is detected in the step 122.

User input relating to obstructing objects is processed in step 128 to identifying each of the objects to be electronically removed from the simulated view being presented on the in-vehicle display. Obstructing objects must be identified with reference to a primary data set; that is, the data provided by the primary video camera, and may be identified in different ways. In one embodiment of the invention, the user may use a bounding box to identify, at least roughly, the perimeter of an obstructing object. If touchscreen technology is available, the user may use a fingertip or a stylus to generally trace the perimeter of the object on the screen itself. If a pointing device (e.g., a mouse, joystick, etc.) is available, the user may manipulate the on-screen cursor to define opposite corners of a rectangular bounding box and then drag those corners to enlarge or shrink the bounding box until the bounding box at least generally lines up with the perimeter of the obstructing object. Where either of these technologies is employed, edge detecting algorithms may be then employed to refine the selection of the object perimeter by detecting the object edges in the video data.

In an alternative embodiment, the user may designate classes of objects to be removed from the simulated view; e.g., all cars, all trucks, etc. Further details about this approach are provided later.

Once each obstructing object is identified in the view defined by the primary data set, the pel locations associated with that object (or objects) must be identified in step 130 since the pels in these locations are the ones that need to be replaced by other data in building a simulated view for presentation on an in-vehicle video display.

Pels in the primary data set occurring in the pel locations associated with obstructing object are to be replaced with pels contained in video data received from other, secondary video cameras other than the primary video camera. Referring momentarily back to FIG. 4, if the driver of vehicle 66 decided that he wanted to remove the tractor-trailer 64 from a view presented on an in-vehicle display, the process of building a simulated view to accomplish that would likely make use of video data being captured by video cameras on the tractor-trailer 64 itself and/or on the flanking vehicles 60 and 62. From the perspective of the view-building process being carried out on vehicle 66, the video cameras mounted on vehicles 60, 62 and 64 would all be considered secondary video cameras.

Returning to FIG. 8, the V2V system in vehicle 66 would identify each of the secondary video cameras that could provide pel data that might be used to replace pels in the primary data set and would, if not already receiving video data from those cameras, begin receiving it in step 132. Incoming data provided by the primary video camera and the secondary video cameras would be analyzed in step 134 using known image feature detection algorithms, such as the SIFT (Scale Invariant Fourier Transform) or the SURF (Speeded Up Robust Feature) algorithms in order to identify common image features (road signs, road edges, etc.) in all of the data sets that could then be used to identify (step 136) pel locations in at least one of the secondary data sets corresponding with the pel locations associated with the obstructing objects in the primary data set.

Once the appropriate pel locations are identified in at least one of the secondary data sets, the identified pels from the utilized secondary data sets are merged (step 138) with pel data from the primary data set to create a simulated view in which obstructing objects identified by the user are electronically removed; that is, pels representing those objects are replaced by the appropriate pels from the secondary video data sets.

As noted earlier, the user may elect to have an on-screen visual reminder that an object, while visually removed, is physically still present. The user's preferences as to visual reminders are detected in step 140. If the user has not registered a preference for a visual reminder, the simulated view generated by merging appropriate pel data from the primary and second video cameras, is sent to the in-vehicle display for presentation there in a step 146. If the driver has indicated a visible reminder should be provided, the reminder must be generated and added to the video data to be presented on the in-vehicle display.

For purposes of illustration, it is assumes the preferred form of visible reminder is a wireform representation of the object that is being electronically removed from the video images to be presented. A wireform representation, of the type illustrated in FIG. 6, is generated in step 142 and added to the previously merged video data in a step 144 before the modified data is sent to the in-vehicle display for presentation in step 146.

As noted earlier, touchscreen technology and bounding boxes could be used by a driver to generally designate the boundaries or perimeters of objects to be electronically removed from a simulated view. An alternative approach would be to use object recognition technology to identify objects to be electronically removed. According to this approach, the driver would designate classes of objects to be removed and data being provided by the primary video camera would be analyzed using object recognition algorithms to identify objects falling in the designated classes. Once the objects were identified, the previously described approach of identifying pel locations associated with those subjects and replacing pels in those locations with pels derived from video data provided by the secondary video cameras could be used to build the simulated view presented on the in-vehicle display.

Figure 9:
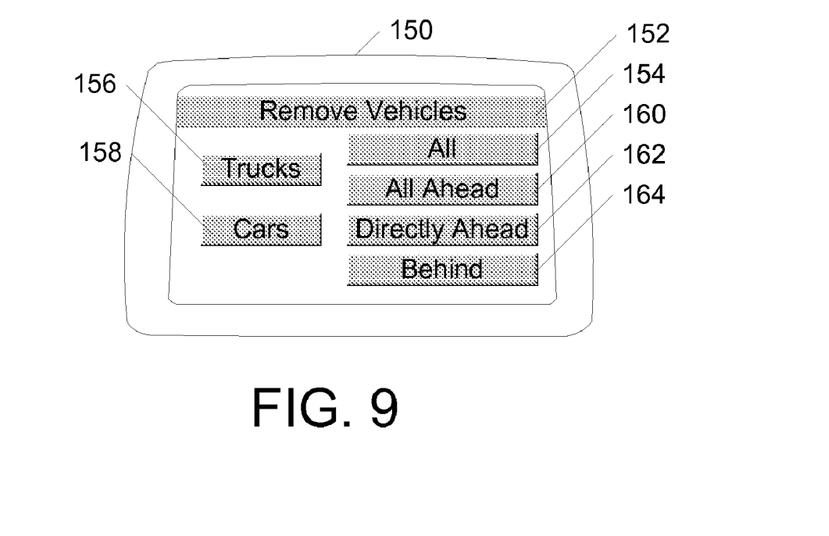
FIG. 9 illustrates one form of user interface that may be employed in selecting objects that can be electronically removed from a presented view.

FIG. 9 illustrates one possible form of user interface for designating classes of objects to be electronically removed from a simulated view. Device 150 is assumed to have a touch sensitive screen that can be used to provide programmatic user menus in the form of "soft" buttons or keys. The particular programmatic menu shown in the drawing would give the user the option of removing at least some vehicles from the simulated view by initially selecting a top level button 152. Once button 152 is selected, the user is presented with additional choices. By selecting button 154, the user can elect remove all vehicles from the simulated view. By selecting buttons 156 or 158, the user can elect to remove trucks and/or cars from the simulated view. Having made that choice, the user may then elect to remove vehicles that are anywhere ahead of the user's vehicle (button 160), only vehicles that are directly ahead of the user's vehicle (button 162), or vehicles that are behind the user's vehicle (button 164). The ability to electronically remove obstructing vehicles from a rear-facing video display may be particularly beneficial where a driver knows that an emergency vehicle is approaching from the rear and needs to know exactly where that vehicle is so that he does not inadvertently move into the path of the approaching emergency vehicle.

Figure 10:
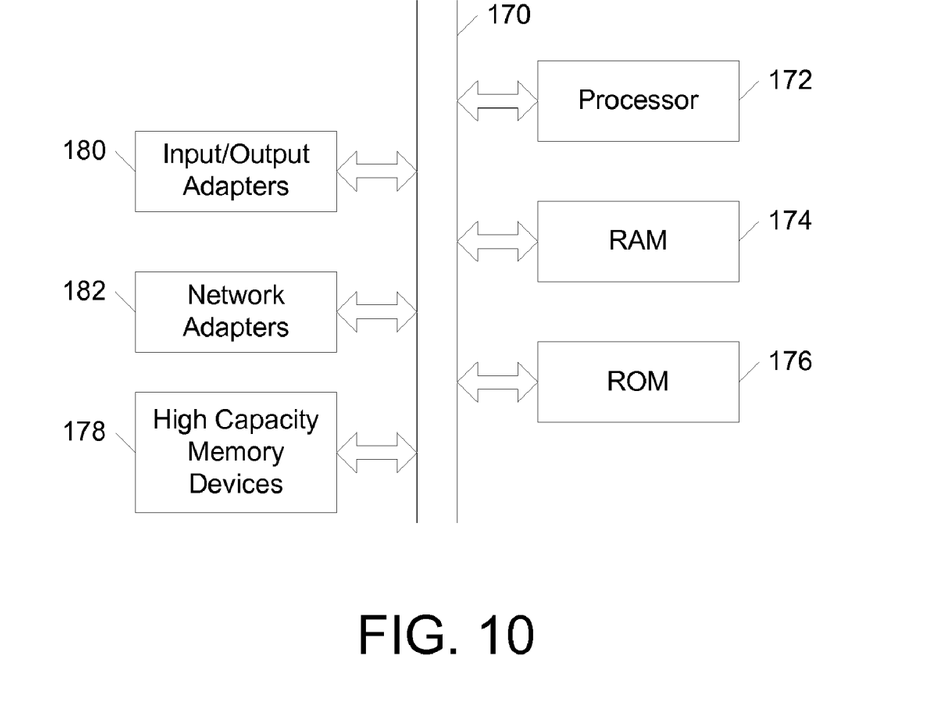
FIG. 10 is a functional block diagram of the hardware infrastructure of a programmable general-purpose computer device that could be used in implementing the present invention.

The infrastructure includes a system bus 170 that carries information and data among a plurality of hardware subsystems including a processor 172 used to execute program instructions received from computer applications running on the hardware. The infrastructure also includes random access memory (RAM) 174 that provides temporary storage for program instructions and data during execution of computer applications and are read only memory (ROM) 176 often used to store program instructions required for proper operation of the device itself, as opposed to execution of computer applications. Long-term storage of programs and data is provided by high-capacity memory devices 178, such as magnetic hard drives or optical CD or DVD drives.

In a typical computer system, a considerable number of input/output devices are connected to the system bus 170 through input/output adapters 180. Commonly used input/output devices include monitors, keyboards, pointing devices and printers. Increasingly, high capacity memory devices are being connected to the system through what might be described as general-purpose input/output adapters, such as USB or FireWire adapters. Finally, the system includes one or more network adapters 182 that are used to connect the system to other computer systems through intervening computer networks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. For example, while the provided description assumes that a primary data set is generated by a video camera mounted on a vehicle being used by the user who wants to build a simulated view, it is well within the scope of the invention for the user to be able to identify any video camera in the V2V network as the primary video camera, to build a simulated view using the identified video camera and transport that simulated view for presentation on a video display in his own vehicle. Moreover, while the invention has been described for use in a V2V network, it obviously has applicability to other networks where multiple video cameras may share video data; e.g., multi-camera video surveillance systems.

Having thus described the invention of the present application in detail and by reference to preferred embodiments thereof, it will be apparent that modifications and variations are possible without departing from the scope of the invention defined in the appended claims.

What is claimed is:

1. A method of generating a view for presentation on a video display comprising:
   receiving a primary set of video data from a first video camera, wherein the first video camera is located on a first participant, and the first participant is coupled to a communication network;
   receiving user input designating an object to be excluded from the view presented on the video display;
   receiving a secondary set of video data from a video camera other than the first video camera, wherein the video camera other than the first video camera is located on a second participant, and the second participant is coupled to the communication network;
   associating data elements in said received secondary set of video data with data elements in said primary set of video data representing an object designated to be excluded from the view presented on the video display, wherein the associated data elements relate to an image of what is in front of the object designated to be excluded;
   generating a set of video data comprising video data from said primary set and said associated data elements in said received secondary set; and
   displaying the generated set of video data on the video display,
   wherein the first participant and the second participant are configured to exchange data over the communication network.

2. A method according to claim 1 wherein each of the first participant and the second participant is a vehicle.

3. A method according to claim 2 further comprising modifying the generated set of video data to include a visible reminder that an object is excluded from the view that would have been presented by the primary set of video data.

4. A method according to claim 3 wherein the included visible reminder comprises a wire form representation of the excluded object.

5. A method according to claim 2 wherein receiving user input designating at least one object to be excluded from the view presented on the video display further comprises receiving the user input designating boundaries of the object to be excluded.

6. A method according to claim 5 wherein receiving the user input designating boundaries of the object to be excluded further comprises using an expandable bounding box to designate the boundaries.

7. A method according to claim 2 wherein receiving user input designating at least one object to be excluded further comprises receiving information designating a class of objects to be excluded from the view.

8. A system comprising a video display and a controller for generating of view to be presented on said video display, said controller comprising:
   a first video input system for receiving a primary set of video data from a first video camera, wherein the first video camera is to be located on a first participant, and the first participant is to be coupled to a communication network;
   a user interface system for receiving a user input designating at least one object to be excluded from the view presented on a video display;
   a second video input system for receiving a secondary set of video data from a video camera other than the first video camera, wherein the video camera other than the first video camera is to be located on a second participant, and the second participant is to be coupled to the communication network;
   video processing logic for associating data elements in said received secondary set of video data with data elements in said received primary set of video data representing an object designated to be excluded from the view presented on the video display, wherein the associated data elements are to relate to an image of what is in front of the object designated to be excluded;
   video combining logic for generating a set of video data comprising video data from said primary set and said associated data elements in said received secondary set; and
   video driver logic for displaying the generated set of video data on the video display, wherein the first participant and the second participant are to be configured to exchange data over the communication network.

9. A system according to claim 8 wherein each of the first participant and the second participant is a vehicle.

10. A system according to claim 9 wherein said video combining logic further comprises logic for modifying the generated set of video data to include a visible reminder that an object is excluded from the view that would have been presented by the primary set of video data.

11. A system according to claim 10 wherein the included visible reminder comprises a wire form representation of the excluded object.

12. A system according to claim 9 wherein said user interface system further comprises means for receiving user input designating boundaries of the object to be excluded.

13. A computer program product for generating a view for presentation on a video display, said computer program product comprising a computer storage device having computer usable program code embodied therewith, said computer usable program code comprising:
   computer usable program code configured to receive a primary set of video data from a first video camera, wherein the first video camera is to be located on a first participant, and the first participant is to be coupled to a communication network;
   computer usable program code configured to receive user input designating at least one object to be excluded from the view presented on the video display;
   computer usable program code configured to receive a secondary set of video data from a video camera other than the first video camera, wherein the video camera other than the first video camera is to be located on a second participant, and the second participant is to be coupled to the communication network;
   computer usable program code configured to associate data elements in said received secondary set of video data with data elements in said received primary set of video data representing an object designated to be excluded from the view presented on the video display, wherein the associated data elements are to relate to an image of what is in front of the object designated to be excluded;
   computer usable program code configured to generate a set of video data comprising video data from said primary set and said associated data elements in said received secondary set; and
   computer usable program code configured to display the generated set of video data on the video display,
   wherein the first participant and the second participant are to be configured to exchange data over the communication network.

14. A computer program product according to claim 13 wherein each of the first participant and the second participant is a vehicle.

15. A computer program product according to claim 14 is further comprising computer usable program code configured to modify the generated set of video data to include a visible reminder that an object is excluded from the view that would have been presented by the primary set of video data.

16. A computer program product according to claim 15 wherein the included visible reminder comprises a wire form representation of the excluded object.

17. A computer program product according to claim 14 wherein said computer usable program code configured to receive user input designating at least one object to be excluded from the view presented on the video display further comprises computer usable program code configured to receive user input designating boundaries of the object to be excluded.

18. A computer program product according to claim 17 wherein said computer usable program code configured to receive user input designating boundaries of the object to be excluded further comprises computer usable program code configured to receive user input designating an expandable bounding box.

19. A computer program product according to claim 15 wherein said computer usable program code configured to receive user input designating at least one object to be excluded from the view presented on the video display further comprising computer usable program code configured to receive user input designating a class of objects to be excluded from the view.

* * * * *